Figure 1:
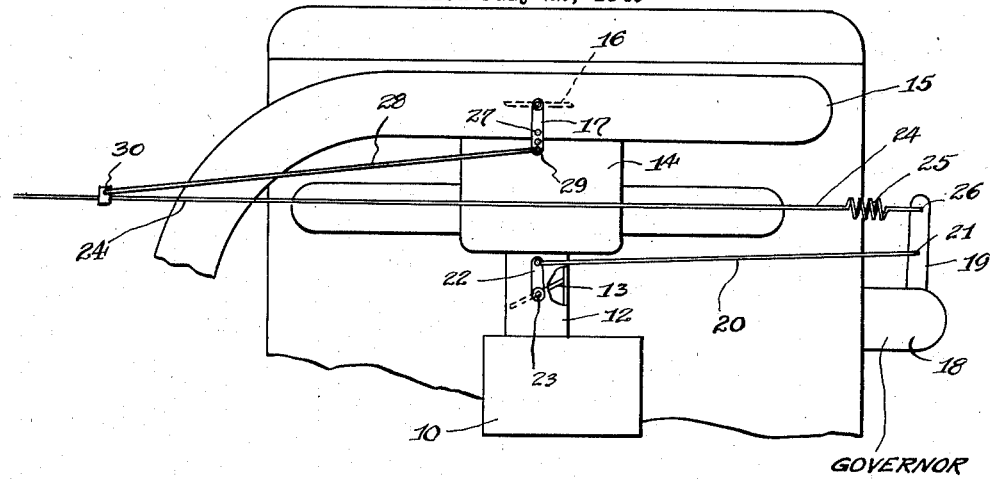

April 28, 1942.   W. ENGSTROM   2,280,942
ENGINE
Filed July 22, 1940

INVENTOR.
William Engstrom
BY
ATTORNEY.

Patented Apr. 28, 1942

2,280,942

UNITED STATES PATENT OFFICE 2,280,942

ENGINE

William Engstrom, Muskegon, Mich., assignor to Continental Motors Corporation, Detroit, Mich., a corporation of Virginia Application July 22, 1940, Serial No. 346,824

9 Claims. (Cl. 123—122)

My invention relates to engines and more particularly to means for controlling engine operation especially in connection with engines constructed and arranged for burning heavier oils or kerosene.

These types of engines are generally known as kerosene burning engines and are usually employed in industrial applications, particularly for powering tractors and other agricultural equipment. These engines are equipped with the usual type carburetor and other special equipment to facilitate the burning of heavier oils or kerosene in the engine, are arranged for starting on gasoline but for operation on kerosene after the engine is warmed up.

When these engines are used to power tractors and other agricultural equipment, it is found that very often such engines are allowed to run at idling speed for long periods of time, and with adjustments made for operation under load, it is found that these adjustments are not satisfactory for idling operation of the engine. Also the conditions under which farm tractors and other agricultural equipment are operated, is such as to expose the engine to the elements and subject the engine to the cold wind which often blows across the farm while the tractor or other equipment is in use. This variation in atmospheric conditions results in upsetting the mechanical adjustment of the engine control mechanism, so that the same will not work satisfactorily. It was found that the application of heat to the fuel intake means was critical and that unless the proper amount of heat is supplied, the engine is liable to stall when idled, it was found that sometimes it was impossible to again speed up the engine without reverting again to the use of gasoline as a fuel. This is very undesirable since the advantage to be gained by the use of these kerosene burning engines is the economy of operation, and when it becomes necessary to frequently restart the engine on gasoline, the economy advantages are not obtained.

An object of my present invention is to overcome the difficulties aforesaid by providing an improved automatic mechanical hook-up between the engine throttle, the governor, and the heat control device which regulates the amount of heat which is to be supplied to the engine intake means.

Another object of my present invention is to obtain improved engine performance, particularly in connection with engines constructed for burning the heavier oils or kerosene, by providing a mechanical connection constructed and arranged to be set so as to relatively increase the amount of heat to be supplied to the engine intake means when the engine speed is reduced, whereby to eliminate the tendency of the engine to stall because of improper vaporization of fuel in the engine intake means.

A further object of my present invention is to insure constant uniform engine operation under various load conditions and different atmospheric conditions by providing mechanical means for regulating the amount of heat to be supplied to the engine intake means, which mechanism includes means whereby same may be manually adjusted in accordance with seasonal and atmospheric conditions under which the engine is operated.

Figure 2:
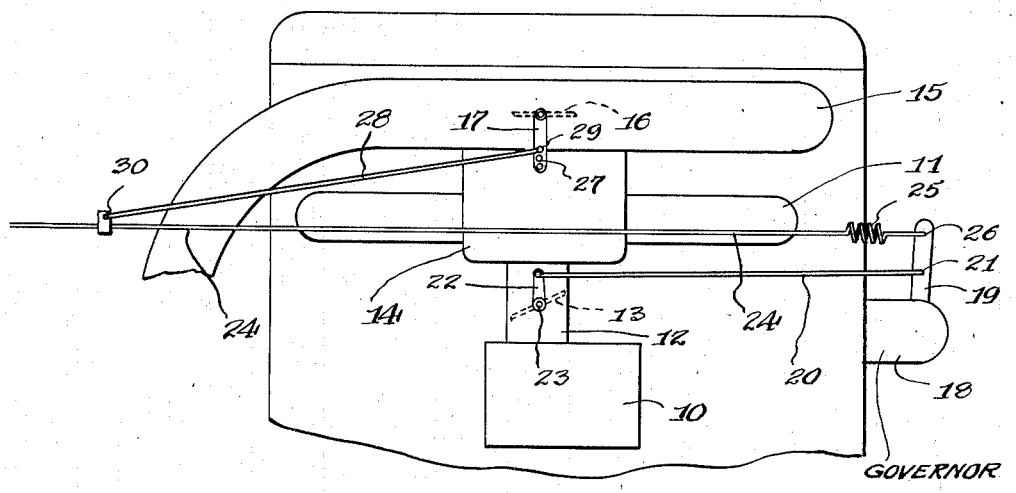

For a more detailed understanding of my invention, reference may be had to the accompanying drawing illustrating a preferred embodiment of my invention and in which:

Fig. 1 is a side elevational view of an engine showing the assembly therewith of a mechanical mechanism interconnecting the engine governor, throttle valve and the heat control device for regulating the amount of heat to be supplied to the engine intake means, and Fig. 2 is a similar view illustrating the same connections in another adjusted position.

In the drawing I have illustrated my invention in connection with a tractor engine, although it will be obviously understood that the principles of my invention may be advantageously incorporated in other types of engines and for other applications as well.

Referring more particularly to the drawing, A designates an internal combustion engine of the type constructed and arranged for initial starting on gasoline or other light fuels, and for operation for the most part on kerosene or heavier oils. The present engine is provided with a carburetor 10 which is constructed to handle both the lighter and heavier oils as the same is selectively supplied to the engine, and is also provided with the usual intake means 11, preferably a multi-ported manifold. This engine intake means is connected with the carburetor by a primary fuel conducting means or riser 12, in which is preferably mounted a throttle valve 13. The engine intake means is provided with a heater box 14 through which at least a portion of the exhaust gases may be conducted from the exhaust manifold 15 to heat the fuel mixture in said intake means whereby to obtain the desired proper vaporization of the fuel mixture for introduction to the engine cylinders.

It has been found that under different operating conditions of the engine, some means is needed for controlling the amount of heat to be supplied to the engine intake means, and in the present instance this is preferably carried out by providing a suitable heat control device comprising a valve 16 actuated by a valve lever 17. The valve 16 may be thus positioned to deflect variable amounts of exhaust gas through the heater box 14.

The engine is provided with a speed governor 18 operable to automatically control the setting of the throttle valve 13, said governor having an actuating arm 19 to which is connected a link 20 as at 21, which link is connected at its other end to an arm 22 carried by the throttle valve shaft 23 which carries said throttle valve 13.

A link or rod 24 extends rearedly of the engine to a point where access may be had thereto by the driver or operator of the tractor or vehicle. A resilient connection such as a spring 25 connects this link or rod 24 with the governor arm as at 26. The heat control device arm 17 is provided with a plurality of holes 27 and a link 28 is attached to the arm 17 as at 29, connecting this heat control arm with the link rod 24 as the other end of said link 28 is attached or suitably connected to said rod 24 as at 30.

By relatively shifting this rod 24, it would be evident that the relationship between the actuation of the heat control and the governor may be varied. These connections between the governor, engine throttle and the heat control device are constructed for operation in such a way as to supply variable amounts of heat to the engine intake means for different conditions of engine operation. They are constructed in such a way as to preferably supply an additional amount of heat to the engine intake means as the engine speed is decreased and the throttle valve moved toward idling position. By relatively adjusting the link 28 with respect to the arm 17 it will be seen that a greater or lesser amount of heat can be supplied to the engine intake means when the engine is idled. It will be also observed that the arm or link 28 may be attached to any one of the holes 27 carried by the heat control arm or lever 17, thereby selectively obtaining an adjustment in the travel or movement of the heat control valve 16 in relationship with the travel of the rod 24.

One of the practical applications of the present invention is with an internal combustion engine of the type burning gasoline and heavier oils as used for powering farm tractors or other farm equipment. This mechanism provides a mechanical means for interconnecting the governor, the engine throttle valve and heat control device, and furthermore, said mechanism is automatically operable to insure the introduction of an adequate supply of heat to the engine intake means under al conditions of engine operation. In addition, this mechanism can be manually adjusted to vary its operation in accordance with variable conditions of engine operation and under various atmospheric conditions, so as to insure efficient engine performance and economy in operation at all times.

Although I have illustrated but one form of my invention and have described in detail but a single practical application thereof, it will be apparent to those skilled in the art to which my invention pertains, that the principles of my invention are adaptable for other applications and the particular construction and asesmbly of same may be modified or changed without departing from the spirit of my invention as defined in the appended claims.

I claim:

1. In an engine having fluid intake and exhaust means, a carburetor connected with said intake means and a throttle valve associated therewith, a governor, means connecting said governor with said throttle valve, intake heating means associated with said exhaust means and including a control device for regulating the amount of heat transmitted to said intake means, means manually operated to adjust said governor to control engine operation, and means connecting said governor adjusting means directly with said heat control device to vary the adjustment of said heat control device in accordance with the adjustment of said governor.

2. In an engine having fluid intake and exhaust means, a carburetor connected with said intake means and a throttle valve associated therewith, a governor, means connecting said governor with said throttle valve, intake heating means associated with said exhaust means and including a control device for regulating the amount of heat transmitted to said intake means, and adjustable means connecting said governor directly with said heat control device to vary the adjustment of said heat control device in accordance with the adjustment of said governor.

3. In an engine having fluid intake and exhaust means, a carburetor connected with said intake means and a throttle valve associated therewith, a governor, including an actuating arm, means connecting said governor actuating arm with said throttle valve, intake heating means associated with said exhaust means and including a control device for regulating the amount of heat transmitted to said intake means, manually operated means connected with the said governor arm to adjust said governor for controlling engine operation, and adjustable means connecting said first governor control means directly with said heat control device.

4. In an engine having fluid intake and exhaust means, a carburetor connected with said intake means and a throttle valve associated therewith, a governor having an actuating arm, means connecting said governor actuating arm with said throttle valve, intake heating means associated with said exhaust means and including a control device for regulating the amount of heat transmitted to said intake means, means connected with the governor actuating arm and operable to adjust the governor to control the throttle valve setting, and adjustable means directly connecting the aforesaid means with said heat control device, and a spring interposed between the aforesaid connecting means and said governor arm.

5. In an engine having fluid intake and exhaust means, a carburetor connected with said intake means and a throttle valve associated therewith, a governor, means connecting said governor with said throttle valve, intake heating means associated with said exhaust means and including a control device for regulating the amount of heat transmitted to said intake means, and manually operated mechanical means directly connected with said governor for selectively setting said governor to control engine operation and other mechanical means.

6. In an engine having fluid intake and exhaust means, a carburetor connected with said intake means and a throttle valve associated therewith, a governor, means connecting said governor with said throttle valve, intake heating means associated with said exhaust means and including a control device for regulating the amount of heat transmitted to said intake means, mechanical means directly connecting the governor with said heat control device and including a manually adjustable device, and means operable to selectively set said governor for controlling engine operation.

7. In an engine having fluid intake and exhaust means, a carburetor connected with said intake means and a throttle valve associated therewith, a governor, means connecting said governor with said throttle valve, intake heating means associated with said exhaust means and including a control device for regulating the amount of heat transmitted to said intake means, said governor including an arm to which is connected said means connecting the governor with the throttle valve, a link resiliently connected with said arm, manual means for shifting said link to vary the governor setting to control engine operation, and a link directly connecting said first mentioned link with said heat control device.

8. In an engine having fluid intake and exhaust means, a carburetor connected with said intake means and a throttle valve associated therewith, a governor, means connecting said governor with said throttle valve, intake heating means associated with said exhaust means and including a control device for regulating the amount of heat transmitted to said intake means, said governor including an arm to which is connected said means connecting the governor with the throttle valve, a link resiliently connected with said arm, manual means for shifting said link to relatively vary the governor setting to control engine operation, and a second link directly connected with said first link and adjustably connected with said heat control device.

9. In an engine having fluid intake and exhaust means, a carburetor connected with said intake means and a throttle valve associated therewith, a governor, governor control means, mechanical means connecting said governor with said throttle valve, intake heating means associated with said exhaust means and including a control device for regulating the amount of heat transmitted to said intake means and adjusted to supply relatively more heat as the throttle valve is moved towards idling position, and means directly connecting the governor control means with said heat control device and including adjustable means which is operable to vary the relationship between said heat control device and governor whereby to supply relatively more or less heat to said intake means on moving said throttle valve towards idling position.

WILLIAM ENGSTROM.